US012638974B2

(12) United States Patent
Alsop et al.

(10) Patent No.: US 12,638,974 B2
(45) Date of Patent: May 26, 2026

(54) REDUCTION OF PARALLEL MEMORY OPERATION MESSAGES

(71) Applicant: Advanced Micro Devices, Inc., Santa Clara, CA (US)

(72) Inventors: Johnathan Robert Alsop, Seattle, WA (US); Shaizeen Dilawarhusen Aga, Sunnyvale, CA (US); Mohamed Assem Abd Elmohsen Ibrahim, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 597 days.

(21) Appl. No.: 17/954,671

(22) Filed: Sep. 28, 2022

(65) Prior Publication Data

US 2024/0103730 A1      Mar. 28, 2024

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| 7,809,868 | B1 | 10/2010 | Mu |
| 7,908,656 | B1 | 3/2011 | Mu |

| 8,335,860 | B2 | 12/2012 | Moran et al. | |
| 10,649,831 | B2 | 5/2020 | Tokoyoda | |
| 12,210,780 | B2 | 1/2025 | Alsop et al. | |
| 2015/0149490 | A1 | 5/2015 | Kim et al. | |
| 2016/0117175 | A1* | 4/2016 | Alexander | G06F 9/3854 |
| | | | | 712/215 |
| 2016/0196356 | A1 | 7/2016 | Kim et al. | |
| 2018/0129737 | A1 | 5/2018 | Louie et al. | |
| 2020/0004433 | A1* | 1/2020 | Chencinski | G06F 3/0659 |
| 2020/0342294 | A1 | 10/2020 | Jang | |
| 2024/0103876 | A1 | 3/2024 | Agarwal et al. | |
| 2024/0106782 | A1 | 3/2024 | Alsop | |

OTHER PUBLICATIONS

An oxford dictionary definition for coalesce to combine into a single group or thing downloaded from archive.or on Dec. 14, 2017 (Year: 2017).*
https://web.archive.org/web/20171214005836/https://dictionary. cambridge.org/us/dictionary/english/coalesce a definition of coalesce from the cambridge dictionary, screen shot take Dec. 14, 2017 (Year: 2017).*

(Continued)

*Primary Examiner* — Janice M. Girouard
(74) *Attorney, Agent, or Firm* — FIG. 1 Patents

(57) ABSTRACT

In accordance with described techniques for reduction of parallel memory operation messages, a computing system or computing device includes a memory system that receives memory operation messages. A shared response component in the memory system receives responses to the memory operation messages, and identifies a set of the responses that are coalesceable. The shared response component then coalesces the set of the responses into a combined message for communication completion through a communication path in the memory system.

20 Claims, 8 Drawing Sheets

(56)          References Cited

OTHER PUBLICATIONS

An article titled "AIX Version 6.1 General programming concepts" published by IBM in 2018, with relevant pages attached to this office aciton and the full document available online at https://public.dhe.ibm.com/systems/power/docs/aix/61/genprogc_pdf.pdf (Year: 2018).*

Graham, Richard L, et al., "Scalable hierarchical aggregation protocol (SHArP): a hardware architecture for efficient data reduction", COM-HPC '16: Proceedings of the First Workshop on Optimization of Communication in HPC [retrieved May 19, 2022]. Retrieved from the Internet <https://network.nvidia.com/sites/default/files/pdf/solutions/hpc/paperieee_copyright.pdf>., Nov. 13, 2016, 10 pages.

Klenk, Benjamin , et al., "An in-network architecture for accelerating shared-memory multiprocessor collectives", Proceedings of the ACM/IEEE 47th Annual International Symposium on Computer Architecture [retrieved Aug. 23, 2022]. Retrieved from the Internet <https://ieeexplore.ieee.org/stamp/stamp.jsp?arnumber=9138924>., Sep. 23, 2020, 14 Pages.

Sapio, Amedeo , et al., "In-Network Computation is a Dumb Idea Whose Time Has Come", Proceedings of the 16th ACM Workshop on Hot Topics in Networks [retrieved May 19, 2022]. Retrieved from the Internet <https://sands.kaust.edu.sa/papers/daiet.hotnets17.pdf>., Nov. 30, 2017, 7 Pages.

U.S. Appl. No. 17/954,748, filed Nov. 6, 2024 , "Notice of Allowance", U.S. Appl. No. 17/954,748, filed Nov. 6, 2024, 6 pages.

U.S. Appl. No. 17/954,748, filed May 9, 2024 , "Non-Final Office Action", U.S. Appl. No. 17/954,748, filed May 9, 2024, 13 pages.

* cited by examiner

200

```
# (a) Reduction Assembly                    202
Raccum = 0
for i in indices:
        Rtemp <- LD A[i]
        Raccum <- ADD (Rtemp, Raccum)
```

```
# (d) Reduce ISA mod1                       204
Raccum = 0
for i in indices:
        Raccum <- LD_accum (A[i], Raccum)
```

```
# (e) Reduce ISA mod2                       206
Rind <- &indices
Rlen <- indices.size ()
Raccum = LD_reduce (A, Rind, Rlen)
```

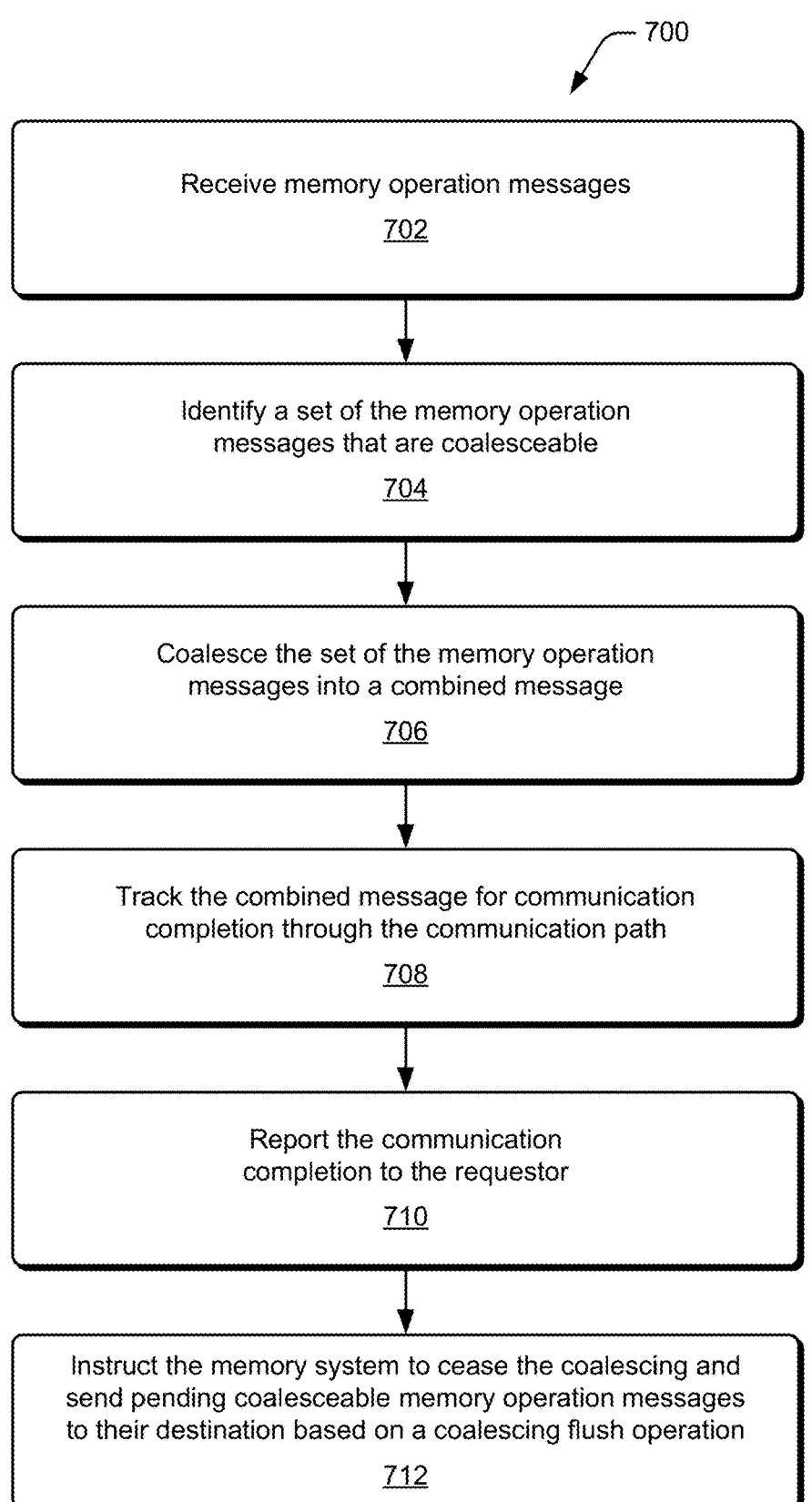

700

Receive memory operation messages

702

Identify a set of the memory operation
messages that are coalesceable

704

Coalesce the set of the memory operation
messages into a combined message

706

Track the combined message for communication
completion through the communication path

708

Report the communication
completion to the requestor

710

Instruct the memory system to cease the coalescing and
send pending coalesceable memory operation messages
to their destination based on a coalescing flush operation

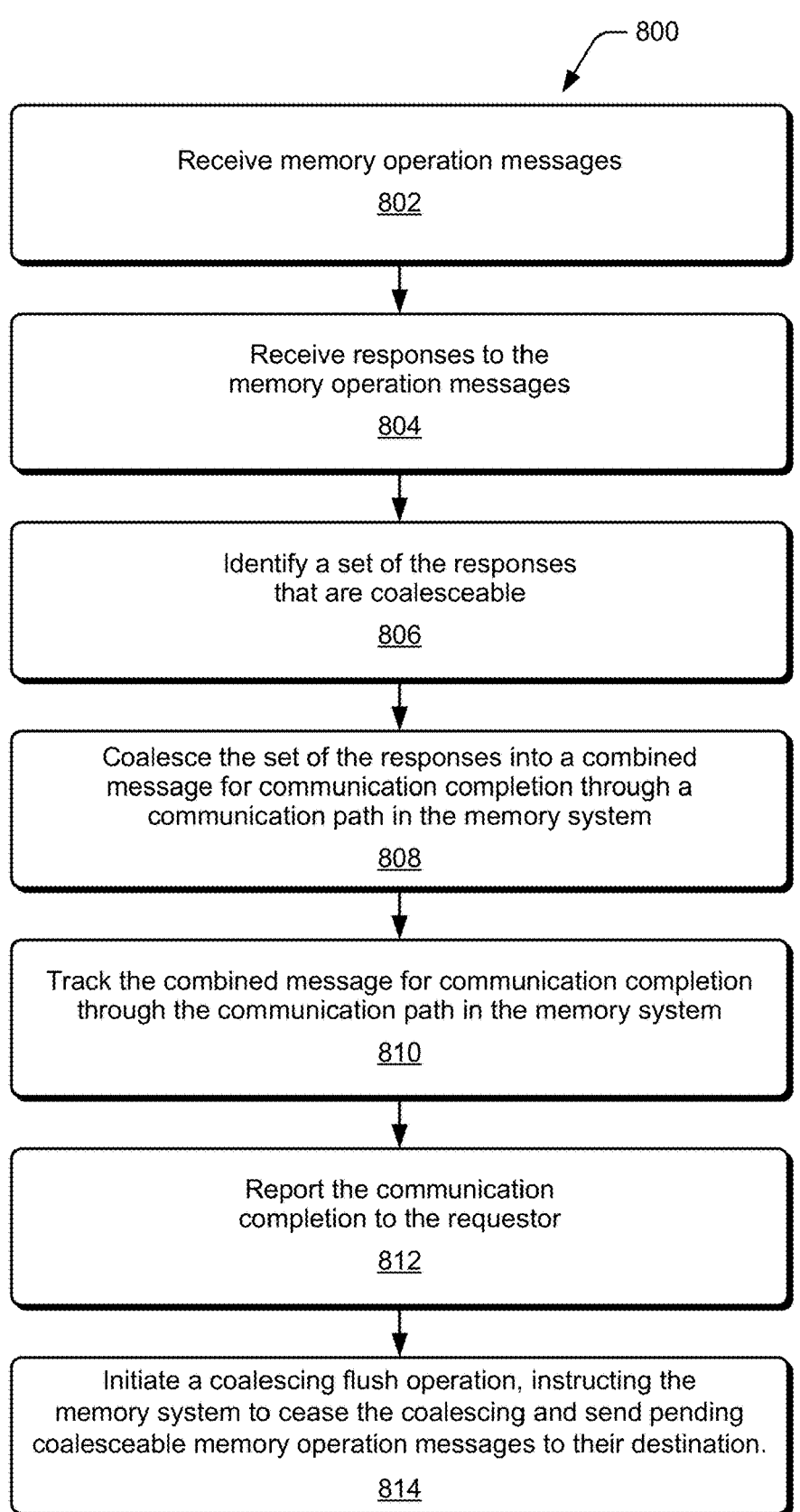

800

Receive memory operation messages
802

Receive responses to the memory operation messages
804

Identify a set of the responses that are coalesceable
806

Coalesce the set of the responses into a combined message for communication completion through a communication path in the memory system
808

Track the combined message for communication completion through the communication path in the memory system
810

Report the communication completion to the requestor
812

Initiate a coalescing flush operation, instructing the memory system to cease the coalescing and send pending coalesceable memory operation messages to their destination.
814

*FIG. 8*

REDUCTION OF PARALLEL MEMORY OPERATION MESSAGES

BACKGROUND

The processing and transfer of data in the memory of computing systems and devices utilizes various conventional techniques to facilitate task migration and offloading some near-memory processing tasks for an instruction thread, such as to process the instructions in device memory and return the requested results. Typically, consideration of whether to offload a processing task accounts for the overhead associated with data transfer latencies, such as when utilizing caches, processing in memory (PIM) devices, and/or other near-memory processing techniques in memory systems.

BRIEF DESCRIPTION OF THE DRAWINGS

The detailed description is described with reference to the accompanying figures.

FIGS. 6-8 depict procedures in example implementations for reduction of parallel memory operation messages, as described herein.

DETAILED DESCRIPTION

Figure 1:
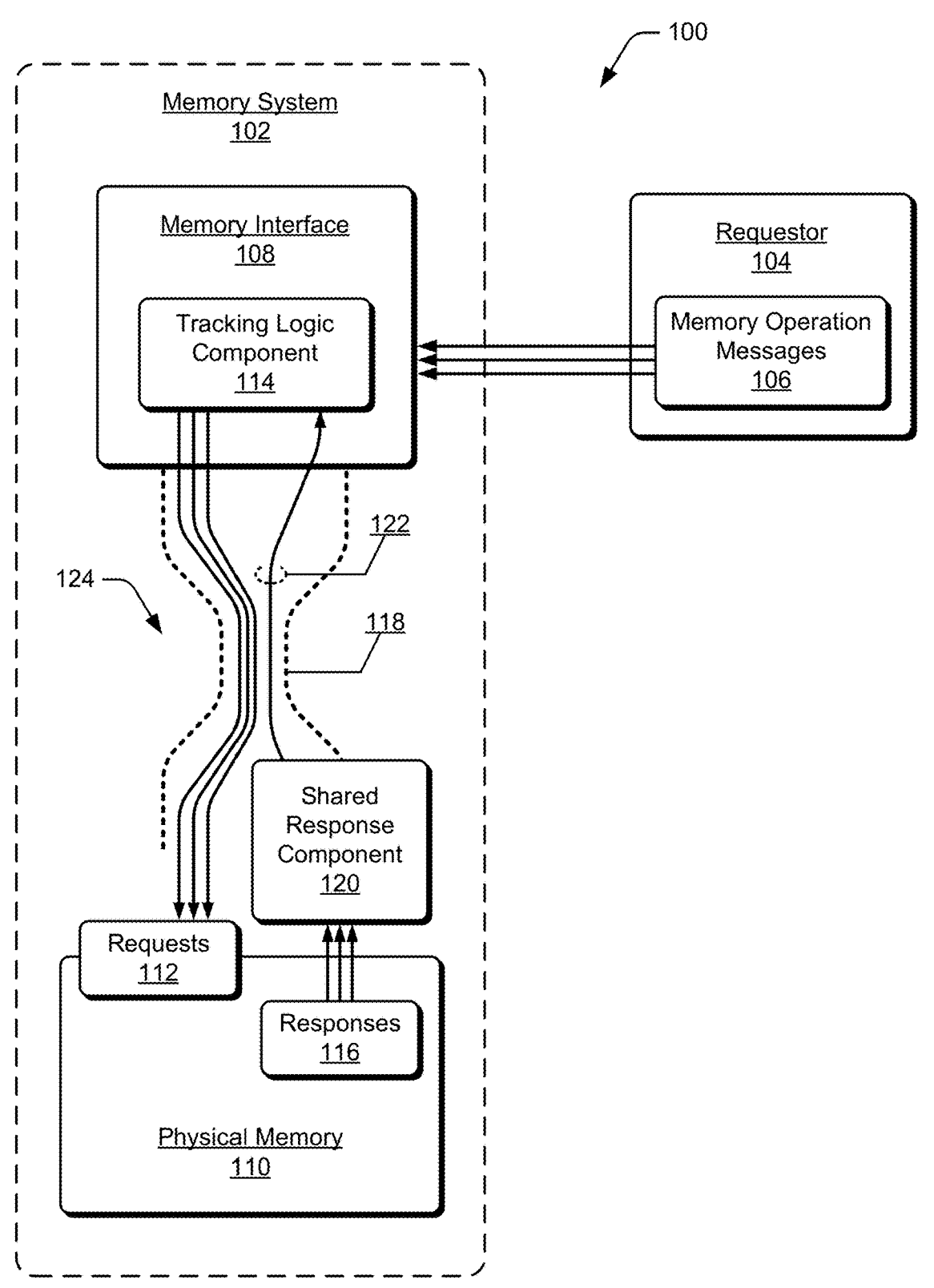
FIG. 1 is a block diagram of a non-limiting example system for reduction of parallel memory operation messages, as described herein.

The transfer of data from memory to perform logic computations on the data in many computer systems or devices can become the dominant performance bottleneck, and this restriction gets worse as computing systems and devices advance. In many computer systems, this throughput bottleneck is attributable to the limited memory expressibility of conventional von Neumann architectures, which can generally only issue load and store instructions, or a limited set of single-address read, modify, write (RMW) operations, and perform computations on the data once it has been transferred to local memory storage.

Overall, the ability to perform computation on data has scaled much faster than the ability to move data in a computing system to computation components. This is evident in the memory wall, as well as in distributed systems where communication primitives, such as all-reduce and all-to-all are quickly becoming the dominant performance limiters of emerging computation workloads, such as for deep neural networks (DNNs). Notably, throughput limitations are due to conventional requestor-centric system implementations (e.g., the von Neumann model). For example, assuming that an instruction thread is assigned to an appropriate processing core, the thread issues memory requests for all of the data it needs to read or write, and the data is transferred to the requesting thread or core. The requested data is then processed and any output data is transferred or communicated from the requesting thread or core to a location in global memory.

As the ability of computing systems and devices to perform computations increases faster than the ability to transfer data between processing cores, aspects of data transfer are beginning to limit computation performance in computing systems and devices. Although local memory storage, such as caches, are used to reduce this type of data transfer by exploiting data reuse, this is inherently limited (e.g., cold misses while accessing memory are not avoided). As computing systems scale, data reuse will only degrade in performance, given that more instruction threads are needed to utilize the available processing cores, and these threads will have dependencies with other threads that inevitably require data movement between components (e.g., memory storage, processing cores, and/or any other components that store, process, utilize, and/or transfer data) at different node locations in a memory system.

Conventional solutions, such as task migration and processing in memory (PIM) are utilized to facilitate reducing data transfer, however existing implementations require software awareness of data locality in order to be effective. For example, a task migration should reduce overall data movement or transfer by enough to offset the processing overhead of transferring the task or thread context across the system. This is difficult to realize for fine-grain tasks, tasks that consume data from multiple different remote sources, and/or tasks that are programmed for a specialized platform (e.g., graphics processing unit (GPU) kernels). Similarly, PIM commands operate on data that is located in the same PIM-enabled memory module, and the reduced data transfer enabled by PIM should outweigh the cost of sending the PIM instruction from a requestor. Overall, reducing the data movement in emerging computing systems using the above strategies involves consideration, as well as control of data mapping and compute mapping, in a way that makes it difficult to handle irregular or input-dependent behavior, new systems with different compute, memory, interconnect organizations, and non-deterministic resource sharing among multiple concurrent workloads.

Aspects of the described reduction of parallel memory operation messages are implemented to improve and/or solve the problems of data transfer throughput in computing systems and devices. The described techniques address the data movement bottleneck in a memory system by implementing expressive memory request types that allow the memory system to condense data prior to transfer in a way that avoids much the of data movement that is incurred by conventional systems, and is amenable to many common coalescing computation patterns (e.g., add, multiply, max, min, AND, OR, etc.). Notably, aspects of the described techniques are implemented without requiring the requesting software (e.g., applications, or other device functions or procedures) to be aware of the physical location of the data in question. The hardware-software (HW/SW) interface is updated to directly reduce data transfer, but without imposing requirements on the software. In one or more implementations, aspects of reduction of parallel memory operation messages are implemented with a set of memory request extensions that reduce data throughput at a very low hardware cost and without requiring awareness of data locality.

In aspects of the described techniques, a computing system or computing device includes a memory system that receives memory operation messages issued in parallel by a requestor. The requestor is, for example, any type of software, application, procedure, device function, device component, and/or system module that initiates the memory operation messages, such as read, modify, and write memory operations. The memory system includes a memory interface (also referred to herein as a hardware-software (HW/SW) interface), which is the interface to a physical memory of the memory system. A shared response component at a shared response node in the memory system receives responses to the memory operation messages, and identifies a set of the responses that are coalesceable to reduce data throughput in a communication path in the memory system. The shared response component then coalesces the set of the responses into a combined message to reduce the data throughput and for communication completion through the communication path in the memory system.

The term coalesce as used herein (as well as the variations coalesceable, coalesced, and coalescing), pertains to merging, processing, and/or combining memory operation messages, such as memory requests and/or memory responses, based on criteria that is evaluated to determine whether a set of memory operation messages (e.g., requests or responses) are to be coalesced into a combined message. The coalescing of memory operation messages, responses, and/or requests is also referred to herein as a reduction. In one or more implementations, the memory operation messages (e.g., requests or responses) are identified to be coalesced together based at least in part on software-specified criteria, such as from a data requestor, based on an address range of one or more accumulation registers in a memory system, and/or based on a requestor identifier of the requestor that issues the memory operation messages.

In some aspects, the techniques described herein relate to a memory system comprising a memory interface to receive memory operation messages, a shared response component to identify a set of the memory operation messages that are coalesceable and coalesce the set of the memory operation messages into a combined message, and a tracking logic component to track the combined message for communication completion through a communication path in the memory system.

In some aspects, the techniques described herein relate to a memory system, where the memory operation messages are communicated individually as requests through the communication path.

In some aspects, the techniques described herein relate to a memory system, where the memory operation messages in the set of the memory operation messages are coalesced in the combined message as a response back through the communication path.

In some aspects, the techniques described herein relate to a memory system where the tracking logic component is configured to report the communication completion as individual accumulation values for each of the memory operation messages of the set of the memory operation messages.

In some aspects, the techniques described herein relate to a memory system where the tracking logic component is configured to report the communication completion as a single response for the set of the memory operation messages.

In some aspects, the techniques described herein relate to a memory system where the tracking logic component is configured to indicate an accumulation operation identifier for the set of the memory operation messages in the combined message.

In some aspects, the techniques described herein relate to a memory system where the tracking logic component is configured to communicate one of a reduction response for the set of the memory operation messages, or individual responses for each of the memory operation messages in the set of the memory operation messages.

In some aspects, the techniques described herein relate to a memory system, where the memory operation messages are identified based on at least one of software-specified criteria, a property of an address of one or more accumulation values in the memory system, a requestor identifier of a requestor that issues the memory operation messages, a local state of a coalescing unit, or a data field added to one or more of the memory operation messages.

In some aspects, the techniques described herein relate to a memory system where the shared response component is configured to coalesce already-coalesced memory operation messages at a subsequent stage in the communication path forming a hierarchical coalesced set of the memory operation messages.

In some aspects, the techniques described herein relate to a memory system where the shared response component is configured to initiate a coalescing flush operation instructing the memory system to cease coalescing and send pending coalesceable memory operation messages to their destination.

In some aspects, the techniques described herein relate to a computing device comprising a memory system to receive memory operation messages, and a shared response component to receive responses to the memory operation messages, identify a set of the responses that are coalesceable, and coalesce the set of the responses into a combined message for communication completion through a communication path in the memory system.

In some aspects, the techniques described herein relate to a computing device including a tracking logic component to track the combined message for the communication completion through the communication path.

In some aspects, the techniques described herein relate to a computing device, where the tracking logic component is configured to report the communication completion as individual accumulation values for each of the responses to the memory operation messages in the set of the responses.

In some aspects, the techniques described herein relate to a computing device, where the tracking logic component is configured to report the communication completion as a reduction response for the set of the responses to the memory operation messages.

In some aspects, the techniques described herein relate to a computing device, where the memory operation messages are received with an accumulation operation identifier for the set of the responses in the combined message.

In some aspects, the techniques described herein relate to a computing device, where the shared response component is configured to initiate a coalescing flush operation instructing the memory system to cease coalescing and send pending coalesceable responses to their destination.

In some aspects, the techniques described herein relate to a method of identifying memory operation messages that are coalesceable in a memory system, and coalescing the memory operation messages into a combined message for communication response through the memory system.

In some aspects, the techniques described herein relate to a method, where the coalescing the memory operation messages comprises coalescing responses to the memory operation messages into the combined message for the communication response through the memory system.

In some aspects, the techniques described herein relate to a method including one of reporting the communication response as individual accumulation values for each of the memory operation messages, or reporting the communication response as a reduction response for the combined message of the memory operation messages.

In some aspects, the techniques described herein relate to a method including initiating a coalescing flush operation instructing the memory system to cease coalescing and send pending coalesceable memory operation messages to their destination.

FIG. 1 is a block diagram of a non-limiting example system 100 for reduction of parallel memory operation messages, as described herein. The example system 100 is illustrative of any type of a computing system or computing device that includes a memory system 102 and a requestor 104, which initiates memory operation messages 106 to the memory system. The requestor 104 is, for example, any type of software, application, procedure, device function, device component, and/or system module that initiates the memory operation messages 106, such as read, modify, and write memory operations. Aspects of the described reduction of parallel memory operation messages also applies to load requests and responses in a memory system. The memory system 102 includes a memory interface 108 (also referred to herein as a hardware-software (HW/SW) interface), which is the interface to a physical memory 110 of the memory system. The example system 100 is implementable in any number of different types of computing systems or computing devices, with various components, such as a device with a processor system and the memory system 102.

The physical memory 110 is any of a variety of volatile memory, such as dynamic random access memory (DRAM), or any of a variety of nonvolatile memory, such as resistive random access memory (e.g., memristors). The memory interface 108 manages the memory operation messages 106, such as modifying data, reading data from, and writing data to the physical memory 110. The memory interface 108 is, for example, a memory controller that receives the memory operation messages 106 from the requestor 104 and performs the corresponding read, modify, or write access to the physical memory 110 as requests 112 associated with the memory operation messages.

In this example system 100, the memory interface 108 includes a tracking logic component 114 that tracks the pending requests 112 until appropriate responses 116 to the data requests are returned from the physical memory 110 (e.g., requested data for a read access, or confirmation of a write or modify access). Although illustrated as a module or component of the memory interface 108, the tracking logic component 114 is implementable as an independent module or component, separate from the memory interface in the memory system 102. Aspects of the tracking logic component 114 implemented for reduction of parallel memory operation messages are further shown and described with reference to FIGS. 4 and 5.

As indicated above, the transfer of data in memory of a computing system or computing device can be the dominant performance bottleneck for data throughput of memory operation messages, and the restriction limits computation performance for data throughput in a communication path 118 in the memory system 102. In this example system 100, the memory system 102 includes a shared response component 120 in aspects of the techniques for reduction of parallel memory operation messages. In one or more implementations, the shared response component 120 receives the responses 116 to the requests 112 (e.g., initiated as the memory operation messages 106 from the requestor 104). The shared response component 120 identifies a set of the responses 116 that are coalesceable to reduce the data throughput in the communication path 118 in the memory system 102. The shared response component 120 then coalesces the set of the responses 116 into a combined message 122 for communication completion through the communication path.

Aspects of the tracking logic component 114 implemented for reduction of parallel memory operation messages are further shown and described with reference to FIGS. 2 and 3. Although illustrated as a separate module or component of the memory system 102, the shared response component 120 is implementable as an integrated module or component of the memory interface 108 or the physical memory 110. In one or more implementations, the shared response component 120 includes independent processing, memory, and/or logic components functioning as a computing and/or electronic device integrated with the memory system 102 and/or with the example system 100. Alternatively, or in addition, the shared response component 120 is implemented in software, in hardware, in firmware, or as a combination of software, hardware, and/or firmware components.

In this example, the shared response component 120 is implemented as a software application, component, or module, such as executable software instructions (e.g., computer-executable instructions) that are executable with a processor system of a computing device or computing system to implement aspects of the techniques for reduction of parallel memory operation messages, as described herein. As a software application, component, or module, the shared response component 120 is stored on computer-readable storage memory (e.g., memory of a device), or in any other suitable memory device or electronic data storage implemented with the component or module. Alternatively, or in addition, the shared response component 120 is implemented in firmware and/or at least partially in computer hardware. For example, at least part of the component or module is executable by a computer processor, and/or at least part of the component or module is implemented in logic circuitry.

In many computing systems and devices, a memory interface is a device node interconnect between devices on-chip, or the interconnect from on-chip to off-chip, that poses data movement restriction, such as for multiple requests 112 and multiple responses 116 across a communication path for data throughput, and the restriction limits computation performance in the communication path 118 in the memory system. In computing systems and/or devices, a higher bandwidth is typically available toward the top of the system (e.g., nearer the caches that are closer to the compute cores), as well as higher bandwidth toward the bottom of the system, where the memory structures support parallelism at the bank level and deeper in order to handle latencies, such as for row activation. This type of higher bandwidth is also exploited by a PIM. Similarly, in distributed systems, the interconnect will often form a bottleneck, with higher data bandwidth available at the top and bottom of a system, which represents the bandwidth between devices in a cluster and between a device and its local memory. Many distributed systems are mapped in hierarchical topologies that are represented by the communication path restriction (e.g., a bottleneck) as shown generally at 124. Even for non-hierarchical interconnects, an interconnect is likely to be the source of a bottleneck when the overhead to scale all-to-all bandwidth to more nodes (O(n2)) is much greater than that to scale local bandwidth (O(n)).

In this example system 100, the shared response component 120 receives the responses 116 to the requests 112 (e.g., initiated as the memory operation messages 106 from the requestor 104). The shared response component 120 identifies a set of the responses 116 that are coalesceable to reduce the data throughput in the communication path 118 in the memory system 102. The shared response component 120 then coalesces the set of the responses 116 into a combined message 122 for communication completion through the communication path. Although the example is shown and described for coalescing responses, a shared request component is implementable in the memory system 102 for coalescing the requests 112, or a set of the requests, to reduce the data throughput in the communication path 118 nearer to the requests being received.

In one or more implementations, the memory operation messages 106 from the requestor 104 are received in the memory system with an accumulation operation identifier for set of the responses 116 in the combined message. As described above, a set of the responses 116 in this example are coalesced based on criteria that is evaluated by the shared response component 120 to determine the responses coalesced into the combined message 122. In one or more implementations, the criteria include software-specified criteria, such as extra information added to the message at the requestor 104, a property of an address of one or more accumulation values in the memory system 102, a requestor identifier of the requestor 104 that issues the memory operation messages 106, a local state of a coalescing unit, and/or a data field added to one or more of the memory operation messages.

Figure 2:
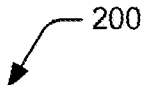
FIG. 2 depicts non-limiting examples of a hardware-software interface reduction functions to reduce data transfer and alleviate throughput restriction of a communication path for memory operation messages in example implementations of reduction of parallel memory operation messages, as described herein.

FIG. 2 depicts non-limiting examples 200 of hardware-software (HW/SW) interface reduction functions to reduce data transfer and alleviate throughput restriction of a communication path for memory operation messages in example implementations of reduction of parallel memory operation messages, as described herein. In applications, a compute task reads multiple values from a remote memory location, and combines them using a reduction function after having transferred them across a communication path, (e.g., a data transfer interface that is restrictive of data throughput). If two data responses share a node along the response path prior to the interface (e.g., the responses are both received or communicated from the same memory element), a quantity of the data transfer is reduced by performing the reduction at that shared node and then only returning the reduced result. In doing so, the performance and energy efficiency for the growing range of applications that are limited by data throughput is improved.

In these examples 200, a code pattern is shown in pseudocode at 202. Multiple elements of an array A are added together to produce a final accumulation result. Although there is a register dependency between accesses to the array A limiting memory parallelism, this is avoidable via techniques such as loop unrolling, thread level parallelism, register renaming, etc., such that loads to data structure A are issued to memory in parallel. Note that simple reduction patterns are shown in these examples, whereas aspects of the described reduction of parallel memory operation messages also supports more complex operations, such as multiplying by a constant before accumulating, or a reduction of elements from different data structures.

In aspects of the described reduction of parallel memory operation messages, dynamically coalescing the responses 116 on the return of the communication path 118 saves data bandwidth. In one or more implementations, this includes changes to the memory interface 108 (e.g., HW/SW interface), logic at the shared response node for coalescing by the shared response component 120, and logic (e.g., the tracking logic component 114) near the requestor 104 to handle coalesced responses. Not all of the memory operation messages (e.g., the requests 112 and/or the responses 116) should be coalesced, and the hardware of the HW/SW interface relies on information from the software to determine when to implement the shared response component 120 coalescing the memory operation messages. One way to determine which memory operation messages to coalesce is to define address ranges, requestor threads, and/or timespans for which all requests are coalesceable. If this technique is used, no change to the memory requests themselves are needed (it would simply require setup functions).

One way to determine which memory operation messages to coalesce is to differentiate coalesceable loads at the instruction set architecture (ISA) level. In an implementation, this new request type has the same semantics of the data load, with coalesced requests returning the reduced value for one request and a null value to another request (or 0, in the case of summation). This reduces data throughput without impacting pipeline architecture and without significantly impacting load semantics. However, this does not prevent redundant reduce computation at the requestor 104. In another implementation, the memory interface is modified with a new instruction (or system call) that encapsulates the dependency requirements and available parallelism of the reduction operation.

For example, a new request type is shown at 204 as LD_accum, which is issued as a coalesceable load request in parallel with other iterations, utilizing a small change to the dependency checking and scheduling logic, where the register dependency is ignored and responses are processed out of order as long as the updates of Raccum (the addition of returned values) happen atomically. Similarly, a new request type is also shown at 206 as LD_reduce, which takes as an input, the address of a data structure containing indices to reduce. This represents a more significant programming interface change, with issuance of coalesceable requests and management of responses being handled by system software or by a new hardware unit. This implementation is analogous to a coalesceable direct memory access (DMA) operation.

In alternative one or more implementations, the memory interface 108 is extended to define the type of reduction operation to be utilized, and which of the responses 116 are to be coalesced with each other. For example, the reduction operation used for coalescing is defined using setup code prior to launching coalesceable requests (e.g., via a system call, writes to memory-mapped configuration registers, or a new instruction type which sets up this information). Alternatively, or in addition, the reduction operation is specified via information in the coalesceable requests themselves (e.g., similar to RMW operations), or by some combination of the described techniques.

From a perspective of the memory system 102, the hardware of the memory interface 108 is also implemented to determine or distinguish coalesceable requests and non-coalesceable requests, such as differentiated based on the target address (e.g., all loads to a pre-specified address range are coalesceable), or based on information available in the instruction itself using a separate opcode or additional bit that indicates an instruction is coalesceable. Although the examples 200 shown and described with reference to FIG. 2 pertain to coalescing any coalesceable response with any other coalesceable response, this is not always implemented. Rather, coalescing rules are specified at the setup stage (e.g., to only coalesce responses with adjacent target addresses, responses with addresses that match in bits x:y, responses within a specified memory range or set of memory pages, responses that have the same requestor ID, or other information associated with the message, such as the destination register or scratchpad memory address), or as a new part of the request itself, such as to associate an ID with coalesceable requests such that only requests with matching IDs are coalesced with each other. In some implementations, the setup stage simply specifies that all messages are coalesceable until coalescing is disabled by a second "stop coalescing" operation.

Figure 3:
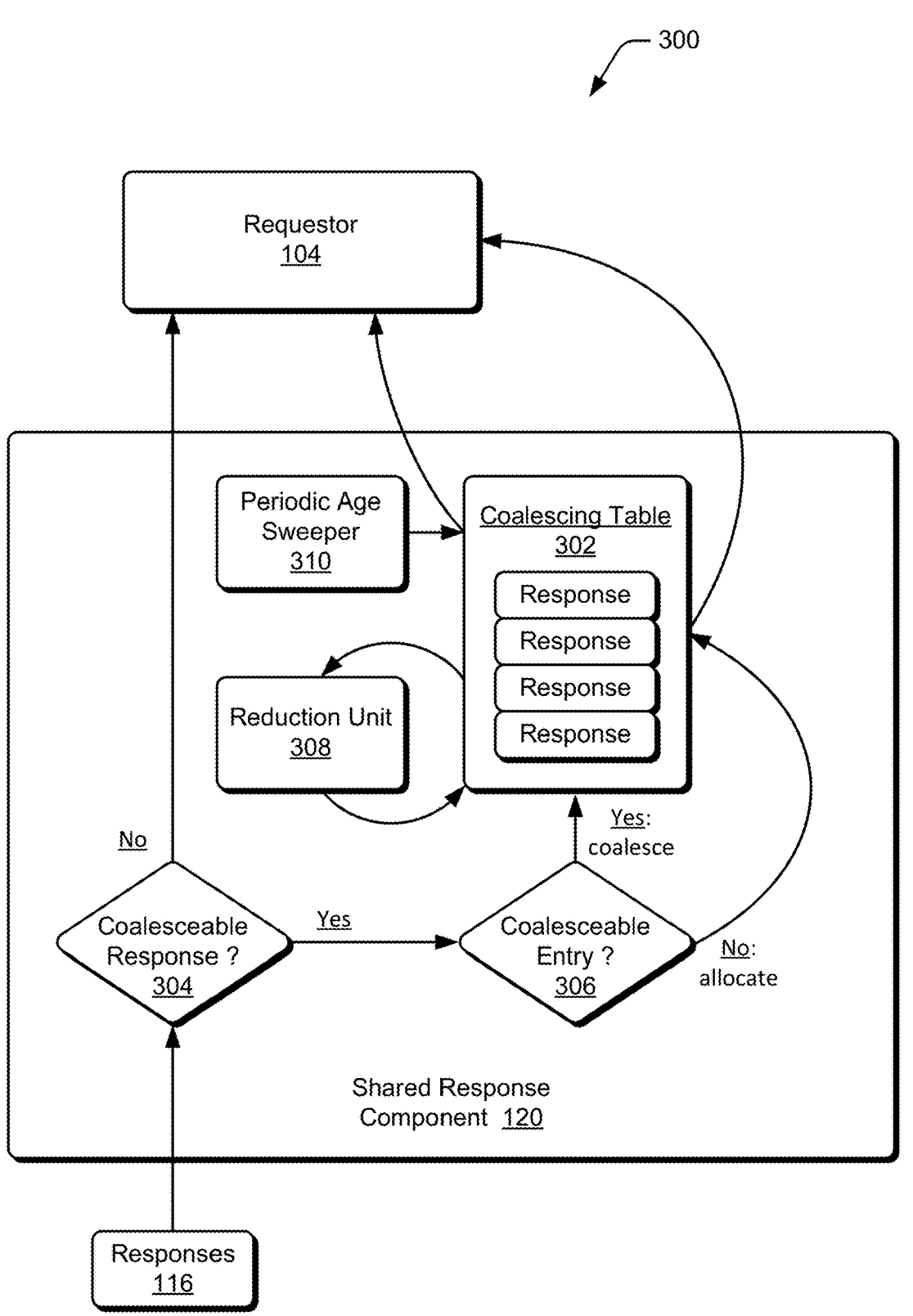
FIG. 3 depicts a non-limiting example of a shared response component for data coalescing in an example implementation of reduction of parallel memory operation messages, as described herein.

FIG. 3 depicts a non-limiting example 300 of a shared response component for data coalescing in an example implementation of reduction of parallel memory operation messages, as described herein. As described above, the shared response component 120 is implemented to detect or determine coalesceable responses and perform a reduction to generate a combined message 122 as a new coalesced response message that replaces two or more original responses without affecting functionality. In one or more implementations, some of the responses 116 are delayed, and the delayed responses are tracked so that they are evaluated for coalesceability. In an implementation, the shared response component 120 utilizes a coalescing table 302 that stores the delayed responses and is indexed based on coalesceability criteria (e.g., a target address, a requestor or thread ID, a software-defined coalescing ID, etc.). In an implementation, the coalescing table 302 is a dedicated structure, or leverages existing storage, such as PIM near-memory registers, a cache, scratchpad storage, etc. Coalesceable responses are delayed in the coalescing table 302 in the shared response component 120, and if subsequent responses are coalesceable with a stored response in the table, then the shared response component 120 performs a reduction operation to coalesce the responses.

In an implementation, the shared response component 120 receives one or more of the responses 116, and determines at 304 whether a received response is coalesceable, such as based on the coalesceability criteria (e.g., a target address, a requestor or thread ID, a software-defined coalescing ID, etc.). In an implementation, a determination of whether an incoming response 116 is coalesceable and whether it is to be coalesced with another response in the coalescing table 302 is based on address, requestor ID, and/or additional software-specified information in the request. If a received response is determined as not being coalesceable (i.e., No from 304), then the response 116 is passed through and returned to the requestor 104. If a received response is determined to be coalesceable (i.e., Yes from 304), then at 306, the shared response component 120 searches the coalescing table 302 for another pending response to be coalesced (i.e., Yes from 306).

If a coalesceable response is determined to be coalesceable with a response that is already an entry and maintained in the coalescing table 302, then the shared response component 120 coalesces the responses into a single response (e.g., a combined message 122), which involves a reduction operation by a reduction unit 308, potentially as well as additional compute, such as multiplying with a constant. The coalesced response is then either maintained in the coalescing table 302, or the coalesced response is communicated to the requestor if additional coalescing is impossible, undesirable, or unlikely based on a heuristic predictor, application-specific data specified at the setup phase, local state such as congestion at the coalescing unit, or request-specific data provided in the response message (e.g., request age and/or quality of service (QoS) guarantees).

If a coalesceable response is not found in the coalescing table (i.e., No from 306), then the shared response component 120 can allocate an entry in the coalescing table 302 for the incoming response, which is then coalesceable with subsequent incoming responses. Alternatively, the shared response component 120 passes it through to the requestor 104 if it is determined that coalescing is impossible, undesirable, or unlikely for that message based on a heuristic predictor, application-specific data specified at the setup phase, local state such as congestion at the coalescing unit, or request-specific data provided in the response message (e.g., request age and/or QoS guarantees). An incoming response can be undesirable for coalescing as related to QoS, given that coalescing delays responses, thus increasing latency. In an implementation, a least recently used (LRU) policy or a first-in first-out (FIFO) policy is used to replace existing responses in the coalescing table 302, at which point they will be communicated back to the requestor.

In one or more implementations, some of the response entries in the coalescing table 302 are protected from eviction from the coalescing table 302, such as by using an additional protection bit, based on a priority of the response(s), or based on the possibility of additional coalescing. However, with reference to additional coalescing, an implementation includes the shared response component 120 evicting those response entries that have already been through the process of one or more reductions by the reduction unit 308. In another implementation, the shared response component 120 assigns a higher priority protection to a partially-reduced, evicted response from one coalescing node that is then maintained in a next coalescing node to provide for some degree of reduction before being communicated back to the requestor 104 through the communication path.

Eventually, all of responses 116 are communicated back to the requestor 104, and the shared response component 120 implements a periodic age sweeper 310 to perform a periodic sweep of the coalescing table 302. In an implementation, responses that are maintained as coalesced in the coalescing table 302 are removed and communicated back to the requestor 104 within some finite, designated period of time to prevent indefinite request latencies. In an implementation, this is implemented via an additional bit in each table entry that is checked and set by a periodic sweep of old table entries, or via a flush operation sent by the requestor 104 to initiate the shared response component 120 returning any delayed responses. In an implementation, the flush operation request from the requestor 104 targets a single response (e.g., a response to a memory operation message request) that is passed from the requestor to another coalescing unit on the path to the requestor. The other coalescing unit passes the flush operation request to the next one and so on. In another implementation, the flushing operation request is broadcast to all of the coalescing units to ensure a timely response from the coalescing units. This eviction policy implemented by the periodic age sweeper 310, as well as the replacement policy, the strategy for determining coalesceability, the reduction operation implemented by the reduction unit 308, and the strategy for determining when to insert or send back responses to the requestor 104 are designated or selected based on expected workload demands, or they are flexible and programmable.

In one or more implementations, there are multiple coalescer nodes distributed throughout the memory system 102, such as to allow for high coalescing throughput, and the multiple coalescer nodes on a single return path for a response allows for hierarchical coalescing of responses. The described techniques provide for coalescing an additional memory operation message (e.g., a request or a response) into a set of already coalesced responses or memory operation messages forming a hierarchical coalesced set of the memory operation messages. When already-coalesced responses 116 are further coalesced with each other at a hierarchical coalescer node, any metadata associated with them is combined at each subsequent coalescing node. Further, already-coalesced messages can be coalesced again, potentially at a later node in the response path. Some responses 116 also simply bypass the coalescing logic, such as to improve throughput performance if the shared response component 120 itself becomes a bottleneck, and the responses continue along a response path as usual with no change to functionality.

In other aspects, multiple coalescing units are implementable in the memory system 102, and to better utilize the limited space in the coalescing tables, each coalescing unit is configurable to only coalesce a subset of memory operation messages that pass through it based on requestor IDs, address ranges, or other information included in the request and/or response. In this way, the software controls where requests are optimally coalesced (e.g., based on network topology and/or the location of coalesceable data), and also reduce contention for coalescing table entries at some nodes. This configuration occurs prior to execution, or dynamically in response to real-time contention.

Figure 4:
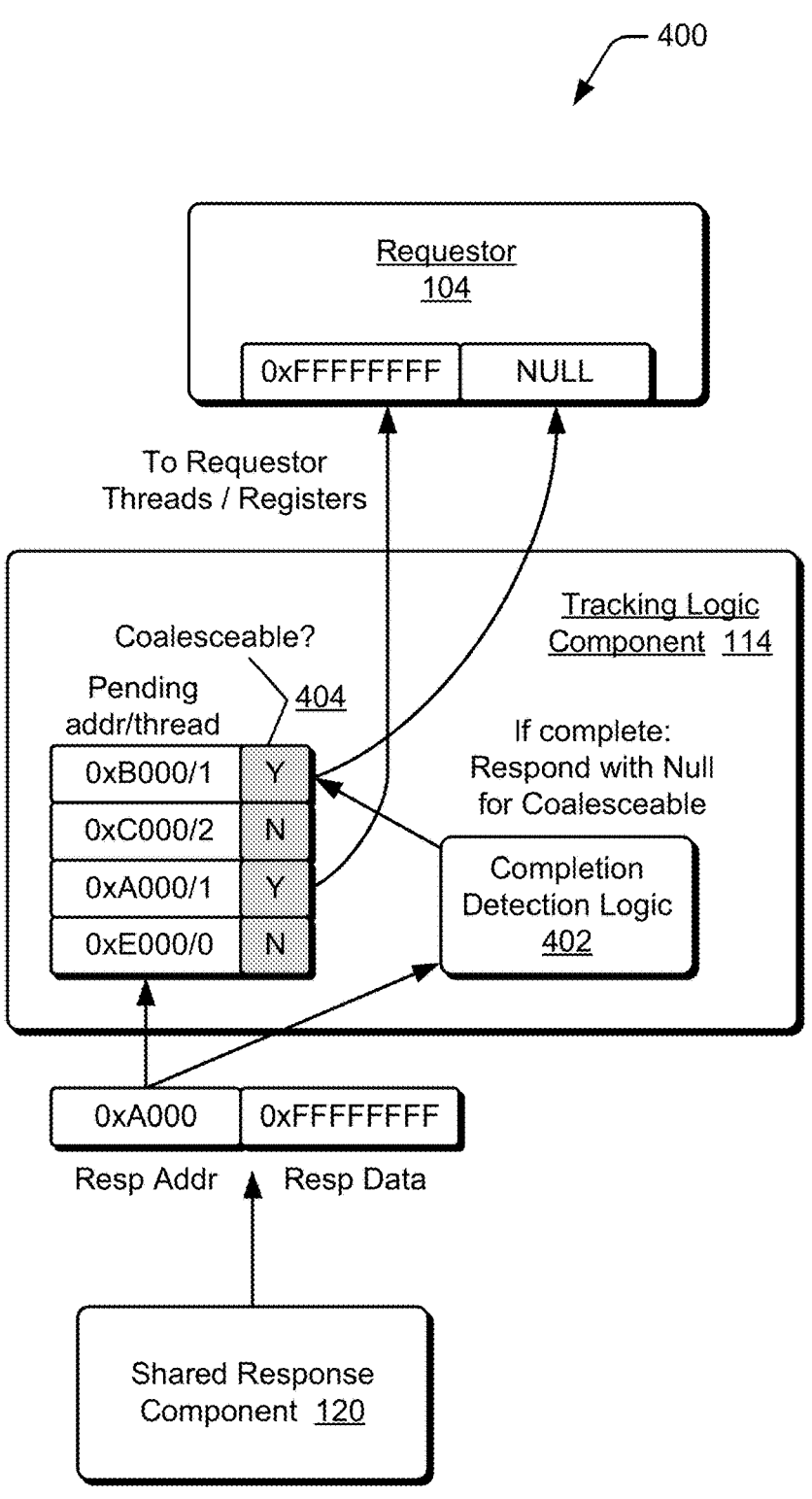
FIG. 4 depicts a non-limiting example of a tracking logic component for tracking pending requests and response completion in an example implementation of reduction of parallel memory operation messages, as described herein.

FIG. 4 depicts a non-limiting example 400 of a tracking logic component 114 for tracking pending requests and response completion in an example implementation of reduction of parallel memory operation messages, as described herein. In a conventional von Neumann system, information about each pending data request is tracked until the associated response is returned to the requestor 104, at which point the information is used to direct the response to the appropriate thread or register. However, in aspects of the described dynamic communication coalescing, some responses that have been coalesced will not be returned, and the tracking logic component 114 is implemented to provide a mechanism to prevent the requestor 104 from waiting indefinitely for the responses that are not returned. In this example 400, the requestor 104 assumes that each request will produce a separate response, and if two or more responses are coalesced, all but one of them will simply send a NULL value as a response. This reuses much of the conventional pending request tracking logic that exists in current cores, but with the addition of completion detection logic 402 and a coalesceable indication 404 for each pending response address or thread. Based on the coalesceable indication 404 for a pending address or thread, the tracking logic component 114 can track a request from the requestor 104 that is processed and returned as a response (to the request) from the shared response component 120. Accordingly, the tracking logic component 114 can detect and track when coalesced responses to the requests are completed. The completion detection logic 402 is implemented to determine whether the coalesced responses to the requests are complete and returned to the requestor.

In one or more implementations, the memory interface 108 (e.g., a HW/SW interface) assumes that a separate response 116 will be returned for each coalesceable request. The tracking logic component 114 enhances the pending request tracking with a counter for pending coalesceable requests, which are incremented whenever a coalesceable request is issued. The counter for tracking pending coalesceable requests is implemented as a component or module of the completion detection logic 402. The coalescing tables of the shared response components at the shared response nodes are enhanced with a counter in each entry denoting how many responses to requests have been coalesced, and this is sent back with the response from the shared response component. Whenever a coalesced response arrives at the requestor 104, this new pending coalesceable counter is decremented by the number of responses that had been coalesced. If the counter reaches zero, then all pending coalesced responses to the coalesceable requests have been satisfied, the completion detection logic 402 traverses the pending coalesced responses, and responds to the associated threads and/or registers of the requestor with a null value.

In another implementation, coalesceable request completion is detected by use of labels, which are defined to identify an individual pending coalesceable request or groups of pending coalesceable requests. A label is defined based on a thread ID or address corresponding to a coalesceable request and associated response, or simply based on the index in the pending request table. When a response 116 is coalesced, the label associated with each coalesced response is either sent back immediately to the requestor 104 (similar to a data-free response), or it is appended to the final coalesced response. When a coalesced response arrives at the requestor 104, all associated labels are unpacked and the pending coalesced requests are responded to individually. This adds metadata overhead to the responses 116, but allows forward progress for each individual coalesced response before all coalesced responses return, and it frees up use of pending table entries during that time. Labels can also be associated with coarser grain groups of responses (e.g., responses from the same thread) and used with a per-group counter to determine coalesceable request completion at a finer granularity than the single counter implementation described above. In this case, multiple threads are allowed to progress independently when both have pending coalesceable requests, and/or they are used at shared response nodes to prevent coalescing of responses from different threads.

In another implementation, coalesceable request completion is detected without the use of counters or labels in the coalesceable response messages by instead ensuring that all pending coalesceable requests have been satisfied before responding to pending coalesceable request threads or registers with null values, as described above. This is accomplished by the completion detection logic 402 of the tracking logic component 114 sending a probe command to all shared response nodes that have coalescing enabled (e.g., assumes ordering between the probe response and coalesceable responses on the response path), or, if a periodic sweep of pending responses is performed at the response node coalescing table 302, waiting a threshold amount of time proportional to the sweep frequency before assuming that all pending coalesceable requests have been flushed (e.g., this assumes there is a finite maximum network latency on the return path).

Figure 5:
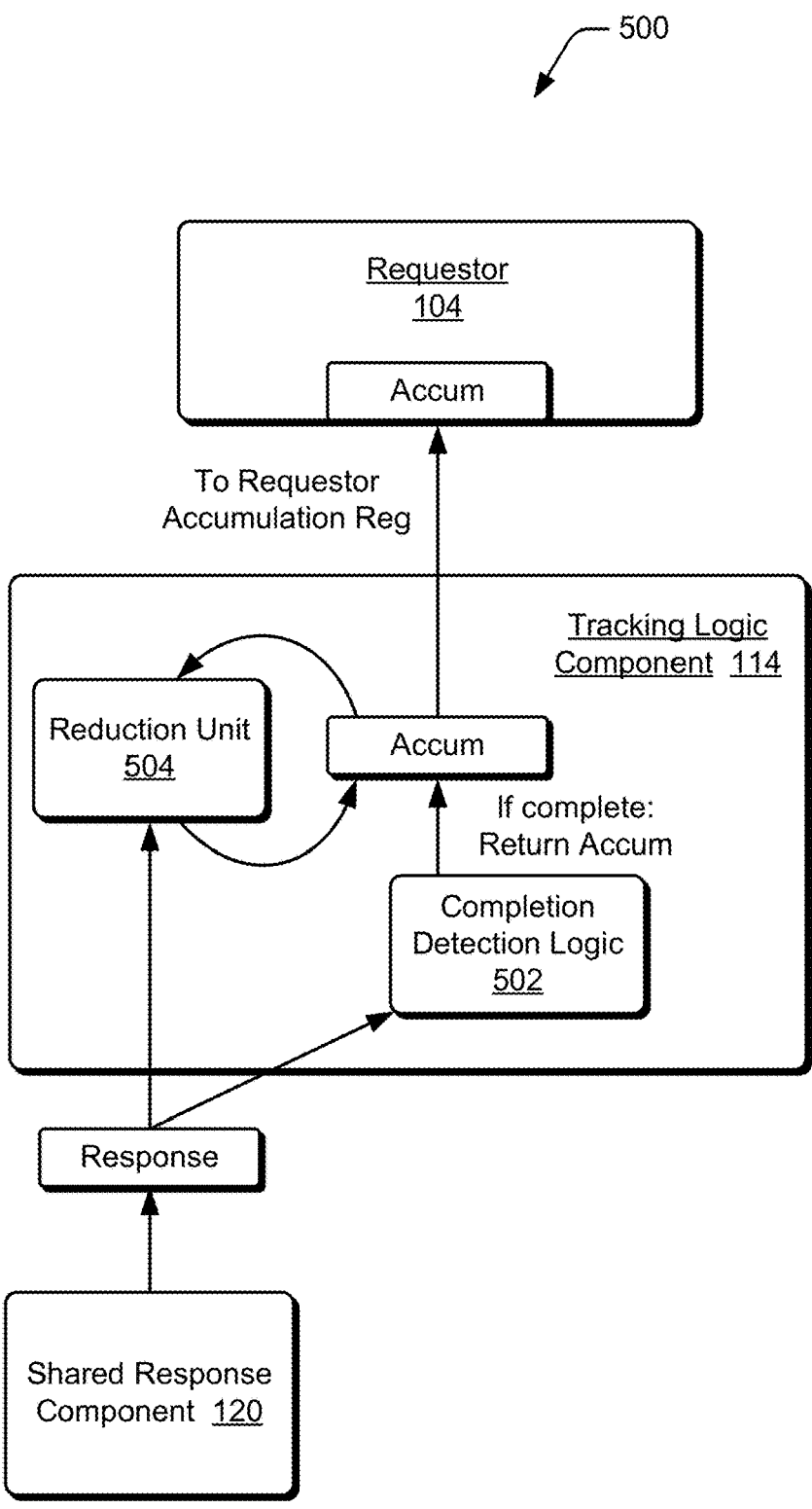
FIG. 5 depicts another non-limiting example of a tracking logic component for tracking pending requests and response completion in an example implementation of reduction of parallel memory operation messages, as described herein.

FIG. 5 depicts a non-limiting example 500 of a tracking logic component 114 for tracking pending requests and response completion in an example implementation of reduction of parallel memory operation messages, as described herein. In this example 500, the requestor 104 assumes that only a single response will be returned, indicating the completion of the reduction with a single accumulation value. This represents a separate tracking logic in the tracking logic component 114 for coalesceable requests, which in some implementations, includes completion detection logic 502, and a reduction unit 504. The completion detection logic 502 is implemented to determine whether coalesced responses to requests are complete.

In an implementation, either of the methods described above with reference to FIG. 4 are used to determine when all pending coalesced responses to coalesceable requests have been returned (e.g., by using a counter, labels, or a probe command), but the memory interface 108 (HW/SW interface) does not require a separate NULL response for every individual request. Instead, the memory interface 108 is used and each coalesced response is sent to the requestor thread and reduced atomically in a single accumulation register. This atomicity is supported by the requestor micro-architecture, but avoids the need for the NULL responses as described above. In an implementation, this is replaced with a single completion signal when all coalesceable requests have completed. If the memory interface 108 is used, the tracking logic component 114 (e.g., pending request tracking logic) reduces each response 116 locally before sending a single response back to the requestor thread when all responses have been received.

Additionally, aspects of the described techniques for reduction of parallel memory operation messages include implementation of a coalescing fence, implemented by the tracking logic component 114 to trigger a flush of coalesceable responses and prevent further coalesceable request issues until all pending coalesceable requests have completed. With respect to cache considerations, some caches or miss status holding register (MSHR)s along a response path have similar expectations as the requestor 104, in that they track pending requests 112 and expect to receive a separate response 116 for each request. In one or more implementations to address this issue, only coalescing for uncached data is used so that both the requests 112 and the (potentially coalesced) responses 116 bypass the cache. Alternatively, or in addition, a form of the near-requestor logic (e.g., the tracking logic component 114) is moved or replicated into the lowest enabled cache level, assuming it is on the side of the data bottleneck nearest the requestor, which would typically be the case for most caches in a computing system or device. A coalesced response should not write a cache line, and the request is prevented from allocating one, or it is invalidated on the response. Alternatively, or in addition, if labels are associated with responses 116 that uniquely identify a pending request (e.g., labels based on address), then minimal logic is needed to handle data-free coalesced responses, or to unpack appended labels. The cache then satisfies the associated pending cache request with null data. A coalesced response should not write a cache line, and the request is prevented from allocating one, or it is invalidated on the response.

Figure 6:
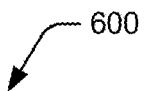
Figure 6:
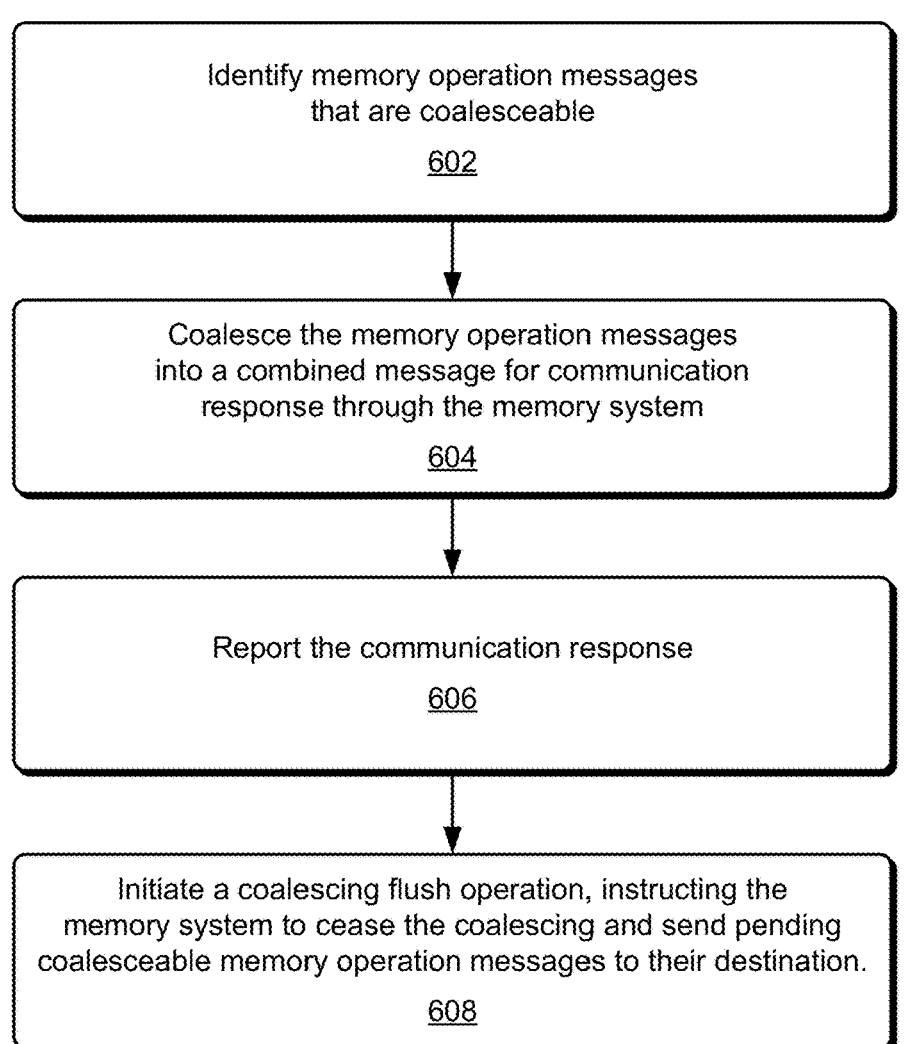

FIG. 6 is a flow diagram depicting a procedure 600 in an example implementation of reduction of parallel memory operation messages, as described herein. The order in which the procedure is described is not intended to be construed as a limitation, and any number or combination of the described operations are performed in any order to perform the procedure, or an alternate procedure.

In the procedure 600, memory operation messages that are coalesceable in a memory system are identified (at 602). For example, the shared response component 120 identifies the memory operation messages 106 that are coalesceable in the memory system 102. The memory operation messages are coalesced into a combined message for communication response through the memory system (at 604). For example, the shared response component 120 coalesces the memory operation messages into the combined message 122 for communication response through the memory system 102. In an implementation, the coalescing of the memory operation messages includes coalescing responses to the memory operation messages into the combined message for the communication response through the memory system.

The communication response is reported (at 606). In one or more implementations, the communication response is reported as individual accumulation values for each of the memory operation messages. Alternatively, the communication response is reported as a reduction response for the combined message of the memory operation messages. A coalescing flush operation is initiated, instructing the memory system to cease the coalescing and send pending coalesceable memory operation messages to their destination (at 608). For example, the shared response component 120 initiates the coalescing flush operation.

FIG. 7 is a flow diagram depicting a procedure 700 in an example implementation of reduction of parallel memory operation messages, as described herein. The order in which the procedure is described is not intended to be construed as a limitation, and any number or combination of the described operations are performed in any order to perform the procedure, or an alternate procedure.

In the procedure 700, memory operation messages are received (at 702). For example, the memory system 102 receives the memory operation messages 106, such as can be issued in parallel by the requestor 104. In an implementation, the memory operation messages are received with an indication of an accumulation operation identifier for the set of the memory operation messages in the combined message.

A set of the memory operation messages that are coalesceable are identified (at 704). For example, the shared response component 120 identifies a set of the memory operation messages 106 that are coalesceable, such as to reduce data throughput in a communication path 118 in the memory system 102. In an implementation, the memory operation messages are identified based on software-specified criteria, based on a property of an address of one or more accumulation values in the memory system, based on a requestor identifier of the requestor that issues the memory operation messages, based on a local state of a coalescing unit, and/or based on a data field added to one or more of the memory operation messages.

The set of the memory operation messages are coalesced into a combined message (at 706). For example, the shared response component 120 coalesces the set of the memory operation messages into the combined message 122. In one or more implementations, the memory operation messages are communicated individually as requests through the communication path in the memory system. The memory operation messages in the set of the memory operation messages are then coalesced in the combined message as a response back through the communication path. In an implementation, already-coalesced memory operation messages are coalesced at a subsequent stage in the communication path forming a hierarchical coalesced set of the memory operation messages (e.g., one or more the memory operation messages are hierarchically coalesced, where already-coalesced messages are coalesced again, potentially at a later node in the response path).

The combined message is tracked for communication completion through the communication path (at 708). For example, the tracking logic component 114 tracks the combined message 122 for communication completion through the communication path 118 in the memory system 102. The communication completion is reported to the requestor (at 710). In one or more implementations, the communication completion is reported to the requestor as individual accumulation values for each of the memory operation messages of the set of the memory operation messages. Alternatively, the communication completion is reported to the requestor as a single response for the set of the memory operation messages. The memory system is instructed to cease the coalescing and send pending coalesceable memory operation messages to their destination based on a coalescing flush operation (at 712). For example, the shared response component 120 initiates the coalescing flush operation.

FIG. 8 is a flow diagram depicting a procedure 800 in an example implementation of reduction of parallel memory operation messages, as described herein. The order in which the procedure is described is not intended to be construed as a limitation, and any number or combination of the described operations are performed in any order to perform the procedure, or an alternate procedure.

In the procedure 800, memory operation messages are received (at 802). For example, the memory system 102 receives the memory operation messages 106, such as memory operation messages issued in parallel by the requestor 104. Responses to the memory operation messages are received (at 804). For example, the shared response component 120 receives the responses 116 to the memory operation messages. In an implementation, the memory operation messages are received with an accumulation operation identifier for the set of the responses in the combined message.

A set of the responses that are coalesceable are identified (at 806). For example, the shared response component 120 identifies a set of the responses 116 that are coalesceable, such as to reduce data throughput in the communication path 118 in the memory system 102. In an implementation, the memory operation messages are identified based on software-specified criteria, based on a property of an address of one or more accumulation values in the memory system, based on a requestor identifier of the requestor that issues the memory operation messages, based on a local state of a coalescing unit, and/or based on a data field added to one or more of the memory operation messages.

The set of the responses are coalesced into a combined message for communication completion through a communication path in the memory system (at 808). For example, the shared response component 120 coalesces the set of responses 116 into the combined message 122 for communication completion through the communication path 118 in the memory system 102. The combined message is tracked for communication completion through the communication path in the memory system (at 810). For example, the tracking logic component 114 tracks the combined message 122 for communication completion through the communication path 118 in the memory system 102.

The communication completion is reported to the requestor (at 812). For example, the tracking logic component 114 reports the communication completion to the requestor 104. In one or more implementations, the communication completion is reported as individual accumulation values for each of the responses to the memory operation messages in the set of the responses. Alternatively, the communication completion is reported as a reduction response for the set of the responses to the memory operation messages. A coalescing flush operation is initiated, instructing the memory system to cease the coalescing and send pending coalesceable memory operation messages to their destination (at 814). For example, the shared response component 120 initiates the coalescing flush operation.

The various functional units illustrated in the figures and/or described herein (including, where appropriate, the memory system 102, the memory interface 108, the tracking logic component 114, and the shared response component 120) are implemented in any of a variety of different forms, such as in hardware circuitry, software, and/or firmware executing on a programmable processor, in a microcontroller, or any combination thereof. The procedures provided are implementable in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although implementations of reduction of parallel memory operation messages have been described in language specific to features, elements, and/or procedures, the appended claims are not necessarily limited to the specific features, elements, or procedures described. Rather, the specific features, elements, and/or procedures are disclosed as example implementations of reduction of parallel memory operation messages, and other equivalent features, elements, and procedures are intended to be within the scope of the appended claims. Further, various different examples are described herein and it is to be appreciated that many variations are possible and each described example is implementable independently or in connection with one or more other described examples.

What is claimed is:

1. A memory system, configured to:
    receive memory operation messages;
    coalesce a set of the memory operation messages into a coalesced message; and
    coalesce the coalesced message with at least one additional memory operation message to form a further coalesced message.

2. The memory system of claim 1, wherein the memory operation messages are identified based on at least one of:
    software-specified criteria;
    a property of an address of one or more accumulation values in the memory system;
    a requestor identifier of a requestor that issues the memory operation messages;
    a local state of a coalescing unit; or
    a data field added to one or more of the memory operation messages.

3. The memory system of claim 1, further configured to initiate a coalescing flush operation instructing the memory system to cease coalescing and send pending coalesceable memory operation messages to their destination.

4. A computing device, comprising:
a memory system to:
  receive memory operation messages;
  coalesce a set of the memory operation messages into a combined message;
  track the combined message for communication completion through a communication path in the memory system; and
  initiate a coalescing flush operation that causes the memory system to send one or more pending coalescable memory operation messages to one or more respective destinations.

5. The computing device of claim 4, the memory system further configured to receive the memory operation messages from a requestor, and report the communication completion to the requestor in response to each pending request of the combined message having received a corresponding response via the communication path.

6. The computing device of claim 4, the memory system further configured to track the combined message for the communication completion using a counter that tracks pending memory operation messages of the set.

7. The computing device of claim 4, the memory system further configured to coalesce the set of the memory operation messages into the combined message using a coalescing table that stores coalescable responses of the memory operation messages.

8. The computing device of claim 7, the memory system further configured to insert a coalesceable response in the coalescing table based on the coalescing table missing an existing coalesceable response that is coalesceable with the coalesceable response.

9. The computing device of claim 7, the memory system further configured to generate a coalesced response by coalescing a coalesceable response with an existing coalescable response in the coalescing table that is coalesceable with the coalesceable response.

10. The computing device of claim 9, the memory system further configured to maintain the coalesced response in the coalescing table after coalescing.

11. The computing device of claim 7, the memory system wherein the coalescable responses are responses of the memory operation messages that are identified as coalescable with other responses of the memory operation messages.

12. The computing device of claim 4, wherein the memory operation messages are communicated individually as requests through the communication path.

13. The computing device of claim 4, wherein the memory operation messages in the set of the memory operation messages are coalesced in the combined message as a response back through the communication path.

14. The computing device of claim 4, the memory system further configured to report the communication completion as at least one response that is separate from the combined message.

15. The computing device of claim 4, the memory system further configured to report the communication completion as a single response for the set of the memory operation messages.

16. The computing device of claim 4, the memory system further configured to indicate an accumulation operation identifier for the set of the memory operation messages in the combined message.

17. A method, comprising:
receiving memory operation messages;
coalescing the memory operation messages into a coalesced message;
coalescing the coalesced message with at least one additional memory operation message to form a further coalesced message; and
tracking the further coalesced message for communication completion through a communication path in a memory system.

18. The method of claim 17, wherein coalescing the memory operation messages comprises coalescing responses to the memory operation messages into the coalesced message for communication response through the memory system.

19. The method of claim 17, further comprising one of:
reporting the communication completion as individual accumulation values for each of the memory operation messages; or
reporting the communication completion as a reduction response for the coalesced message of the memory operation messages.

20. The method of claim 17, further comprising initiating a coalescing flush operation instructing the memory system to cease coalescing and send pending coalesceable memory operation messages to their destination.

\* \* \* \* \*